(12) United States Patent
Stáhl et al.

(10) Patent No.: US 8,225,110 B2
(45) Date of Patent: Jul. 17, 2012

(54) CRYPTOGRAPHIC PROTECTION OF USAGE RESTRICTIONS IN ELECTRONIC DEVICES

(75) Inventors: Per Stáhl, Klagshamn (SE); Chris Loreskär, Lund (SE); Bernard Smeets, Dalby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 712 days.

(21) Appl. No.: 12/351,643

(22) Filed: Jan. 9, 2009

(65) Prior Publication Data

US 2010/0180130 A1 Jul. 15, 2010

(51) Int. Cl.
| | |
|---|---|
| G06F 11/30 | (2006.01) |
| G06F 12/14 | (2006.01) |
| G06F 7/04 | (2006.01) |
| H04K 1/00 | (2006.01) |
| H04L 9/00 | (2006.01) |
| G06F 21/00 | (2006.01) |
| H04L 9/06 | (2006.01) |

(52) U.S. Cl. .......... 713/193; 713/189; 726/27; 360/247; 360/277

(58) Field of Classification Search .......... 713/193, 713/189; 726/27; 380/247, 277
See application file for complete search history.

(56) References Cited

U.S. PATENT DOCUMENTS

| | | |
|---|---|---|
| 2005/0079868 A1 | 4/2005 | Shankar et al. |
| 2006/0129848 A1 | 6/2006 | Paksoy et al. |
| 2006/0236111 A1 | 10/2006 | Bodensj et al. |
| 2008/0005577 A1 | 1/2008 | Rager et al. |
| 2008/0082828 A1 | 4/2008 | Jennings et al. |
| 2008/0117889 A1 | 5/2008 | Moitrel et al. |
| 2008/0125094 A1 | 5/2008 | Heurtaux et al. |
| 2009/0007275 A1* | 1/2009 | Gehrmann ............ 726/27 |

FOREIGN PATENT DOCUMENTS

| | | |
|---|---|---|
| WO | 2008/128875 A2 | 10/2008 |
| WO | WO 2008128875 A2 * | 10/2008 |

OTHER PUBLICATIONS

Francis, L.; Mayes, K.; Markantonakis, K.; "An Architecture to Support Multiple Subscriber Identity Applications Accessing Multiple Mobile Telecommunication Access Network System"; Convergence and Hybrid Information Technology, Jul. 2008, pp. 386-395.*

(Continued)

*Primary Examiner* — Matthew Smithers
*Assistant Examiner* — Courtney Fields
(74) *Attorney, Agent, or Firm* — Coats & Bennett, P.L.L.C.

(57) ABSTRACT

An electronic device requires valid control keys to change any usage restriction setting. The device is provided control keys, a secret key, and a signed software object including a batch ID and a hash of the secret key. For each control key, the device generates a cryptographic footprint bound to the device and the secret key. A message authentication code (MAC) of each usage restriction setting is generated, the MAC bound to the device and a control key. To change a usage restriction, the device receives a control key, validates it against the stored footprint, changes the usage restriction settings, and generates a new usage restriction setting MAC. The control key footprints are bound to the secret key, but the device retains only a hash of the secret key.

50 Claims, 4 Drawing Sheets

OTHER PUBLICATIONS

3GPP TS 22.022 V7.0.0. Jun. 2007. "Personalisation of Mobile Equipment (ME); Mobile functionality specification." http://wwww.3gpp.org. 3rd Generation Partnership Project, Valbonne, France.

Menezes, A. J. et al. "hash Functions and Data Integrity." Handbook of Applied Cryptography, CRC Press, Boca Raton, FL, US, Jan. 1, 1997, pp. 321-383.

European Telecommunications Standards Institute. ETSI TS 122 022 V8.0.0 (Jan. 2009). Digital Cellular Telecommunications System (Phast 2+); Universal Mobile Telecommunications System (UMTS); LTE; Personalisation of Mobile Equipment (ME); Mobile functionality specification (3GPP TS 22.022 version 8.0.0 Release 8). Jan. 2009.

\* cited by examiner

CRYPTOGRAPHIC PROTECTION OF USAGE RESTRICTIONS IN ELECTRONIC DEVICES

FIELD OF THE INVENTION

The present invention relates generally to electronic device security, and in particular to a system and method of securely implementing usage restrictions in electronic devices.

BACKGROUND

Electronic devices, particularly mobile communication devices such as cellular radiotelephones, are often sold subject to one or more usage restrictions. For example, a device may be restricted to work only in certain countries, and/or only with certain communication networks and/or service providers. Mobile phones, for example, are often subsidized by service providers, who must tie all use of the subsidized phones to their network, to recover the investment in subsidizing the phones. Thwarting such usage restrictions has become a lucrative business for hackers, and represents a significant loss of revenue for service providers.

For electronic devices, such as many mobile phones, that accept a removable Subscriber Identity Module (SIM) or Universal Subscriber Identity Module (USIM), a straightforward way to implement usage restrictions is to limit the SIM/USIM cards with which an electronic device can operate. Software and protocols implementing and enforcing such limitations are known in the art as SIMLock. The 3GPP Technical Standard 22.022, Personalization of Mobile Equipment, incorporated herein by reference in its entirety, defines five modes of usage restriction (network, network subset, service provider, corporate, and SIM/USIM). Device manufacturers may define and implement additional usage restrictions.

Upon initialization, an electronic device verifies that the inserted SIM/USIM card matches the stored SIMLock settings. The settings are stored in non-volatile memory, and are either integrity protected or encrypted to prevent manipulation. For example, the SIMLock settings can be integrity protected using a cryptographic message authentication code (MAC) computed using a device-specific key, to prevent cloning the SIMLock data. The SIMLock software that confirms the settings and enforces the usage restrictions is secure software, whose integrity is verified prior to execution. Such software is typically cryptographically signed, and is preferably executed on a secure processor, or on a processor in a secure operating mode.

For each usage restriction, a control key must be entered to enable or disable the restriction. For additional security, it is possible to use one control key to enable a particular usage restriction, and a different control key to disable it. The entered control must be verified against information about the control key stored on the device. The control keys are not stored in plaintext, but rather a MAC or a hash of each control key is stored or each control key is encrypted. This prevents the control keys from being copied out of memory. If a MAC (or hash) of each control key is stored, the MAC (or hash) of the entered control key is calculated and compared to the stored MAC (or hash) to authenticate the key. Besides preventing the control keys from being copied out of the memory, the integrity of the MACs, hashes, or encrypted control keys must also be ensured to prevent alteration. Such integrity protection can be achieved using MACs computed using a device specific key.

The most common fraudulent manipulation of SIMLock data is to set the state of each usage restriction to indicate that it is disabled, and then either re-encrypt or re-calculate the integrity of the protected usage restriction settings, depending on the protection mechanism used. These new protected settings are then stored in the non-volatile memory. Another common fraudulent manipulation of SIMLock data is to change control keys to values selected by the attacker and recalculate their protection. Then SIMLock can be unlocked using the ordinary interfaces for unlocking SIMLocks by presenting the new SIMLock control keys. Both of the methods for manipulation of SIMLock data are achieved by exploiting a weakness in the device platform reprogramming protection software.

The two common methods for manipulation of SIMLock data described above require that the key used for integrity protection or encryption is available on the device. One way to protect SIMLock settings and control keys is to cryptographically sign this information using a private signing key that is not available on the device but limited to a group of people responsible for the security solution of the devices. Only the public key matching the private key is available on the device to verify the signed data. Such a private-public key pair is typically common for all devices, and in order to bind the settings to an individual device a device unique identifier is included in the signed data. For example, the International Mobile Equipment Identity (IMEI) for mobile phones may be used. Since the IMEI and other device unique identifiers typically are not known before ME production, the signing of SIMLock data must be done on-line in the ME factory, where the IMEI is known. However, having the private key for signing, that is common for all devices, stored locally in each factory and available to factory personnel is a security weakness, as individuals may copy the keys, and provide them to SIMLock hackers. Instead, on-line digital signing should take place on a secure server with logging capabilities located in a secure environment and controlled by an R&D lab responsible for the security solution of the devices. In this case the factory would for each device transmit the device unique identifier, the SIMLock settings, and the control keys of each device to the sign server, receive a signature on the provided data, and download the data together with the signature to the device. However, many factories in Asian countries lack the network infrastructure to effectively implement the real-time data transfers required by such a solution. This prevents the use of device unique cryptographically signed SIMLock data. Other drawbacks with cryptographically signed SIMLock data are that enabling SIMLock by entering the correct control key and locking to the currently inserted SIM/USIM card after device production, and enabling SIMLock by auto-locking to the first SIM/USIM card inserted into the device after production, are not possible since this requires re-signing of the SIMLock data.

Note that the protection of the state of each usage restriction cannot be included in the signed SIMLock data since it must be possible to unlock a SIMLocked device. Hence, the state is kept outside the signed data and must be protected separately. If cryptographically signed SIMLock data is used such that neither the control keys nor the usage restriction values can be altered, one way to protect the restriction usage state is to require that the control key is available in plaintext for each disabled usage restriction.

SUMMARY

According to one or more embodiments of the present invention, usage restriction settings are securely stored in an electronic device, and cannot be altered without corresponding control keys. The control keys are authenticated prior to altering any usage restriction. In particular, a cryptographic "footprint" of each control key and associated data (e.g., usage restriction ID and whether the key enables or disables the restriction) is generated using a device-specific key and a secret key in a two-part, atomic, first cryptographic function. In a first step, the first function calculates a hash of the secret key and concatenates the control key and associated data to the hash. In a second step, it calculates a MAC over the result using a first device-specific key. The footprints and the hash of the secret key are stored, and the secret key itself is discarded. A second cryptographic function verifies the MAC, given the device-specific key, the hash of the secret key, the control key and associated data, and the expected value of the MAC. The device-specific key is not available to any hardware module or software function other than the first and second cryptographic functions.

A MAC is calculated for each usage restriction setting (e.g., state, value, and hash of associated control key) using the first cryptographic function, using the device-specific key, and a control key and associated data in lieu of the secret key. The control key footprints and usage restriction setting MACs are stored in non-volatile memory and integrity protected with a MAC (using a second device-specific key).

To alter a usage restriction, the device receives a control key. After verifying the associated footprint and usage restriction setting MAC, the device validates the control key and associated data using the second cryptographic function. If the control key is valid, the usage restriction settings are changed, and a new usage restriction setting MAC is generated and stored.

In this manner, a valid control key is required to alter any usage restriction. The control key is validated against its stored footprint, which is bound to the device and a secret key. The usage restriction settings MAC is bound to the device and the control key, and hence is also ultimately bound to the secret key. The device-specific key is not available to any but the first and second cryptographic functions, and once the control key footprints are generated and stored, only a hash of the secret key is retained. Thus, neither the device-specific key, the secret key, nor any control key in plaintext form, is available to a hacker. The stored data is also integrity protected to detect alteration.

Furthermore, the hash of the secret key is contained in a cryptographically signed software object together with a batch ID (BID). The BID is used to bind the signed software object to a batch of phones. The software object may also include allowed usage restrictions for a batch of electronic devices. In the factory, all devices in the batch are programmed with the BID into memory that cannot be altered after production. Each device then validates the software object using the BID. Since a BID is used instead of a device unique identifier the software object can be created and signed in a more secure environment than the factory. The usage restriction of the devices may be activated in the factory, in a customer service center, or even over the air using, e.g., SMS, with the same level of security.

DETAILED DESCRIPTION

Device Hardware

Figure 1:
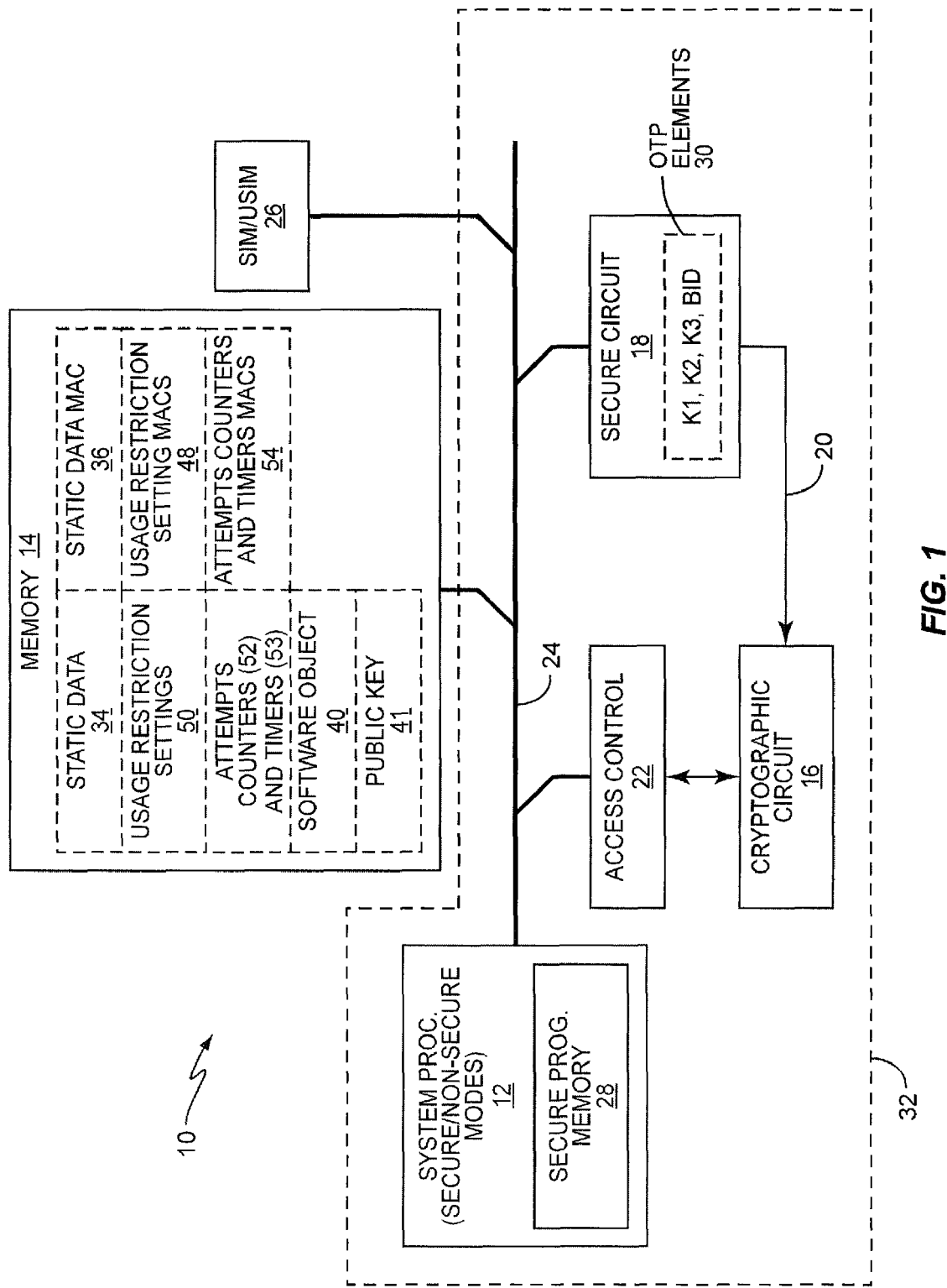
FIG. 1 is a functional block diagram of a representative electronic device.

FIG. 1 depicts a representative electronic device 10. Although the device 10 may advantageously comprise a mobile communication device such as a satellite or cellular radiotelephone, the present invention is not so limited. In general, the device 10 may comprise any electronic device for which a need exists for secure usage restriction management. The device 10 includes processor 12 and memory 14. In one embodiment, the device 10 additionally includes a cryptographic circuit 16 receiving cryptographic keys and other data from a secure circuit 18 via a dedicated connection 20. The processor 12 communicates with the memory 14, cryptographic circuit 16 (such as through an access control circuit 22)—and may write values to the secure circuit 18—via a system bus 24. Authentication data may be provided by a removable memory element such as a SIM or USIM card 26, which appears to the processor 12 as memory on the bus 24.

The processor 12 may be operable in both secure and non-secure modes. For operation in secure mode, the processor 12 may include secure program memory 28, in which secure software modules may execute in isolation from the rest of the system. Alternatively, the secure program memory 28 may reside on-chip, but separate from the processor 12. As one non-limiting example, Advanced Risc Machines® (ARM®) provides a secure processing architecture marketed under the TrustZone® brand. TrustZone® integrates hardware and software security, in part by providing dual-processing environments, including a secure processing environment, which may be used for, e.g., SIM/USIM verification and related processing, and a non-secure environment, which may be used for general device processing. Further examples of secure processing environment provisions with applicability to SIM/USIM-related processing involve the Trusted Computing Group™, which is an association of various companies, including AMD®, Intel®, HP®, and others. In other embodiments, the processor 12 may be a secure processor, with an additional processor (not shown) handling general computational and control tasks.

The cryptographic circuit 16 provides resources for securely executing cryptographic functions. The cryptographic circuit 16 may be, as depicted in FIG. 1, a hardware-based circuit having logical circuit structures or otherwise programmed to carry out desired cryptographic processing functions. The security of cryptographic processing on the cryptographic circuit 16 is ensured by an access control circuit 22, which allows access to resources of the cryptographic circuit 16 only by secure processes. Those of skill in the art will readily recognize that the access control functionality may, in other embodiments, be embedded in the cryptographic circuit 16. Alternatively, the cryptographic circuit 16 may be integrated with the processor 12, with access control functionally executed in software.

The cryptographic circuit 16 receives data, such as cryptographic keys, from a secure circuit 18. The secure circuit 18 securely holds keys, such as K1, K2, and K3, that are unique to the device 10. The secure circuit 18 may additionally hold one or more identifiers, such as a batch identifier (BID), that are associated with the device 10, but are not unique to it. The keys K1, K2, K2, and BID are preferably stored in a plurality of one-time programmable (OTP) elements 30, such as fuses or anti-fuses, which provide permanent and non-alterable storage following initial programming. The initial programming for some keys (K1, K2, K3) may occur during manufacture, or in post-manufacture processing in the factory. Other keys and/or identifiers (e.g., BID) may be programmed during an initialization or activation mode after the device 10 is deployed into distribution channels. In the latter case, the connection of the secure circuit 18 to the bus 24 may be functional only to program the OTP elements 30 by the processor 12 in secure mode, and may be inoperative to read them (that is, it may be a "write only" bus interface).

In at least one embodiment, the connection 20 is a direct connection, or at least is not available for use by other hardware or software entities in the device 10, meaning that only the cryptographic circuit 16 has access to one or more keys, such as K1, as discussed further herein. Further, the cryptographic circuit 16 may be configured such that it never outputs one or more keys, such that one or more keys, such as K1, are unknown and undiscoverable to any module of the device 10 or any software function executing on the processor 12. Still further, the cryptographic circuit 16 and the secure circuit 18 (and optionally the processor 12) may be implemented as parts of an integrated module 32, which may comprise an Application Specific Circuit (ASIC), System-on-a-Chip (SoC), or other such packaged circuit. Advantageously, such physical packaging can be designed to prevent any non-destructive access to the interface 20 between the secure circuit 18 and the cryptographic circuit 16.

The memory 14 includes a non-volatile area holding several specific types of data. Static data 34 includes data that is derived upon the device 10 initialization or activation, and that does not change over the life of the device 10. To protect the integrity of the static data 34, the memory 14 also holds a static data message authentication code (MAC) 36 that is used for authenticating the static data 34. The non-volatile area of memory 14 additionally holds usage restriction settings 50 that are intended to limit or otherwise restrict how the device 10 is used. In particular, the usage restriction settings 50 may restrict operation of the device 10 to a subset of available functions unless an authorized authentication code is available, such as may be contained on a SIM/USIM card 26. Each usage restriction setting 50 is integrity protected by a usage restriction setting MAC 48. Finally, attempts counters 52 and timers 53 associated with the usage restriction settings 50 monitor the number and timing of attempts to alter the usage restriction settings 50. These data are integrity protected by a MAC 54.

As an example, the MACs 36, 48, 54 may be calculated as a keyed-hash message authentication code (HMAC) based on the Secure Hash Algorithm (SHA) 256. Many other MAC generation functions are known, and may be used as needed or desired. Broadly, the MACs 36, 48, 54 are calculated as a function of a key and a data string, i.e., the MACs 36, 48, 54 are defined as $f$ (key, string), where "$f$" is cryptographic derivation function. Integrity of, e.g., the static data 34 against "hacking" or other alteration or corruption is ensured by generating the static data MAC 36 when the static data 34 are generated, and writing the static data MAC 36 to the memory 14 along with the static data 34. When the static data 34 are later read for validation, a new static data MAC 34 is generated from the data, and compared to the stored static data MAC 36. MACs 48, 54 operate similarly.

Cryptographic Hierarchy

Figure 2:
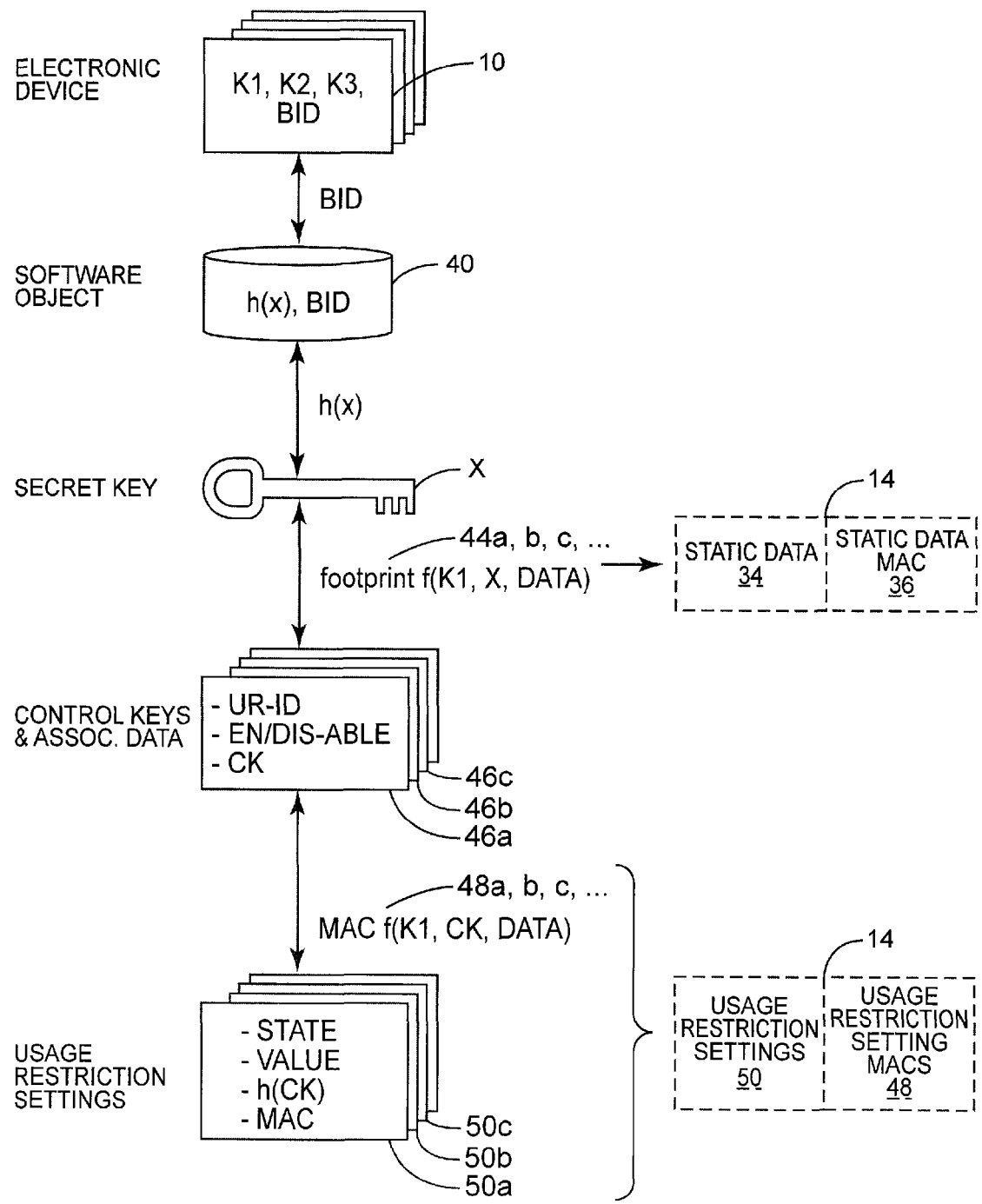
FIG. 2 is a functional diagram depicting the cryptographic hierarchy of the usage restriction management system of embodiments of the present invention.

Embodiments of the present invention provide and implement a multi-tiered cryptographic protection and validation of usage restriction data within the device 10, protecting the data, and the control keys that authorize changes to it, from interception or alteration. This multi-tiered scheme is broadly depicted in FIG. 2, with the details of each tier described in greater detail below. Each device 10 within a group, or batch, includes device-specific keys (K1, K2, K3), and is provided a shared batch identifier (BID). The BID binds the devices to a secure software object 40.

The secure software object 40 includes a hash of a secret key X and the BID. The hash h(x) binds the secure software object 40 to a secret key X provided to each device 10.

Control keys 46, for enabling and disabling usage restrictions, are randomly generated, and presented to each device along with the software object 40. Separate control key data 46 exists for enabling and disabling of each usage restriction (depicted 46a, 46b, 46c, etc.).

The device 10 uses the secret key X to generate and store a cryptographic footprint 44a,b,c... of each control key and its associated data 46a,b,c.... As disclosed in greater detail herein, each footprint 44 is a function of the device-specific key K1, the secret key X, and control key data 46 for a specific usage restriction, $f(K1,X,data)$. As mentioned above, the hash h(x) binds the secure software object 40 to the secret key X. The secret key X is used to create the footprints 44 of the control keys and data 46. Accordingly, the control keys and data 46 are cryptographically bound to the software object 40 (via the secret key X).

The control keys and their associated data 44 are bound to the settings 50a,b,c... of each usage restriction by a usage restriction settings MAC 48a,b,c.... As disclosed in greater detail herein, each usage restriction settings MAC 48 is a function of the device-specific key K1, the corresponding control key data 46, and the settings 50 for a specific usage restriction, $g(K1,CK, data)$.

Cryptographic Functions

Four cryptographic functions are defined, in terms of their inputs and outputs. The functions themselves may be implemented in hardware, such as in the cryptographic circuit 16, receiving keys from the secure circuit 18 and data inputs from the processor 12. Alternatively, the functions may be implemented in secure software modules executing on the processor 12 in a secure mode.

A first cryptographic function F1 binds data to the device 10, given the knowledge of a secret key. The inputs to F1 are a secret key S and data to be protected P, both provided by the processor 12, and a first device-specific key K1, provided by the secure circuit 18. The output of F1 is a message authentication code R. The cryptographic function F1 is defined as $$R = \text{MAC}(K1, h(S) \| P) \quad (F1)$$

where h denotes a hash function, such as SHA-256, MAC denotes a message authentication code function, such as HMAC-SHA-256, and $\|$ denotes the concatenation operator. Note that the input to F1 is S, not h(S). The function F1 first computes h(S) from S, and then concatenates the data to be protected, P, to h(s), and executes the MAC function using the key K1. These two operations are preferably executed atomically. That is, the hash value h(S) flows directly from the hash generation function to the MAC generation function, and is not available as an intermediate variable that can be read or supplied by any other function.

A second cryptographic function F2 verifies data bound to the device 10 using F1, with knowledge of the hash of the secret key. The inputs to F2 are Y, which is the hash of secret key S, and data to be protected P, both provided by the processor 12; the first device-specific key K1, provided by the secure circuit 18; and an expected result R'. In practice, R' is a value previously calculated on P using F1. The output of F2 is a Boolean value Z indicating the result of the verification of the data P. The cryptographic function F2 is defined as $$Z = \begin{cases} \text{TRUE}, & R' = MAC(K1, Y\|P) \\ \text{FALSE}, & R' \ne MAC(K1, Y\|P) \end{cases}. \quad \text{(F2)}$$

The first device-specific key K1 is utilized by both F1 and F2 to cryptographically bind data P to the device 10, and verify that binding, respectively. In one or more embodiments, K1 is not available to any module or function other than the cryptographic functions F1 and F2. For example, in the embodiment depicted in FIG. 1, only F1 and F2 in the cryptographic circuit 16 may access K1 from the secure circuit 18, over the dedicated channel 20.

A third cryptographic function F3 binds data to the device 10. The inputs to F3 are data to be protected P, provided by the processor 12, and a second device-specific key K2 (different than K1), provided by the secure circuit 18. The output of F3 is a message authentication code R. The cryptographic function F3 is defined as $$R = MAC(K2, P). \quad \text{(F3)}$$

A fourth cryptographic function F4 verifies data bound to the device 10 using F3. The inputs to F4 are data to be verified P, provided by the processor 12; the second device-specific key K2, provided by the secure circuit 18; and an expected result R'. In practice, R' is a value previously calculated on P using F3. The output of F4 is a Boolean value Z indicating the result of the verification of the data P. The cryptographic function F4 is defined as $$Z = \begin{cases} \text{TRUE}, & R' = MAC(K2, P) \\ \text{FALSE}, & R' \ne MAC(K2, P) \end{cases}.$$

In one embodiment, a flag or status bit may be set that blocks the execution of F3, but allows the verification of MACs using F4. The "F3 lockout" flag is cleared upon hardware reset. This enhances security by disallowing integrity protected static data 34 in memory 14 from being altered, and a new static data MAC 36 generated to verify it, by an unauthorized module or function.

Activation

Figure 3A:
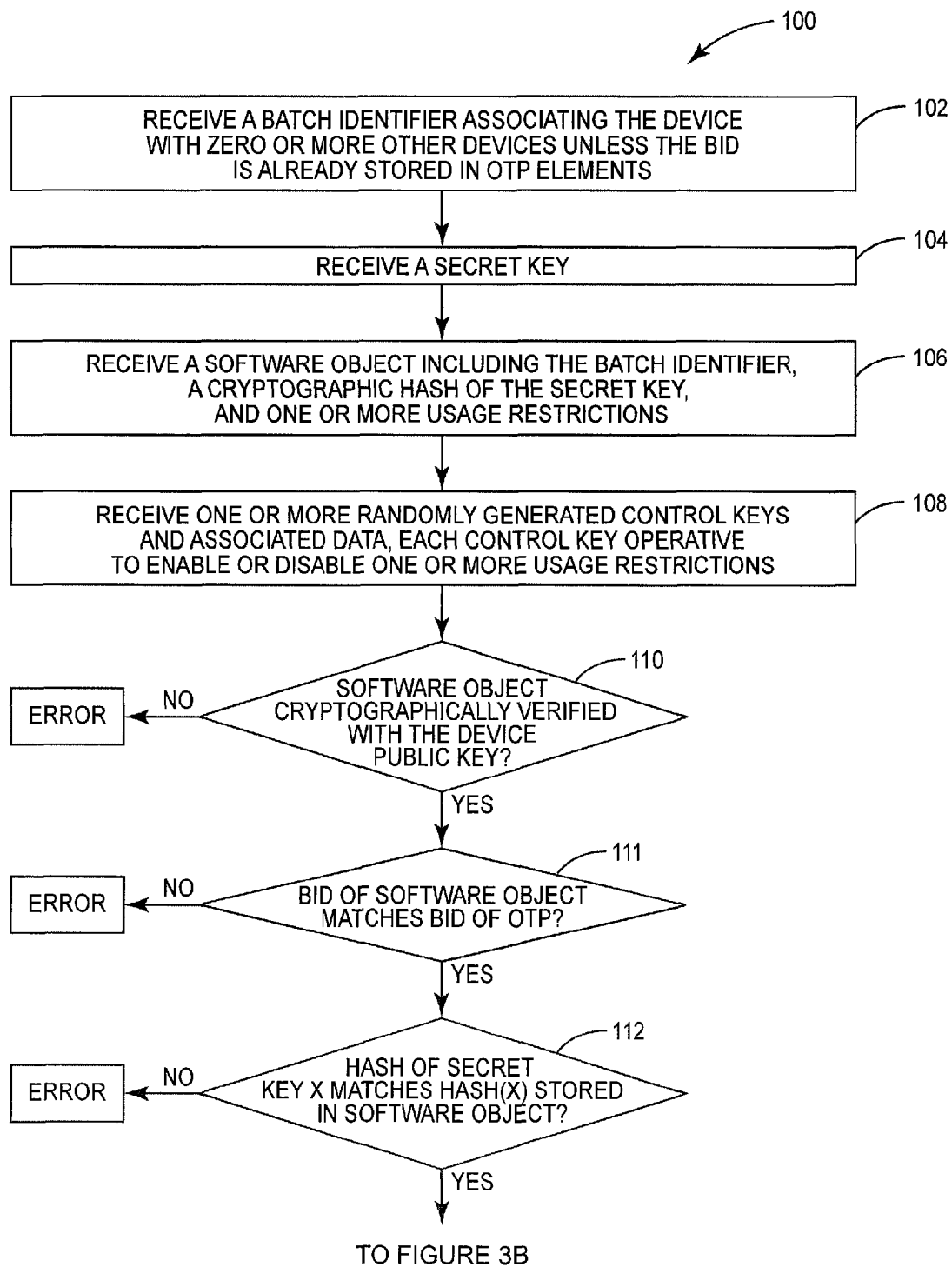
FIG. 3 is a flow diagram of a method of secure usage restriction activation in an electronic device.
Figure 3B:
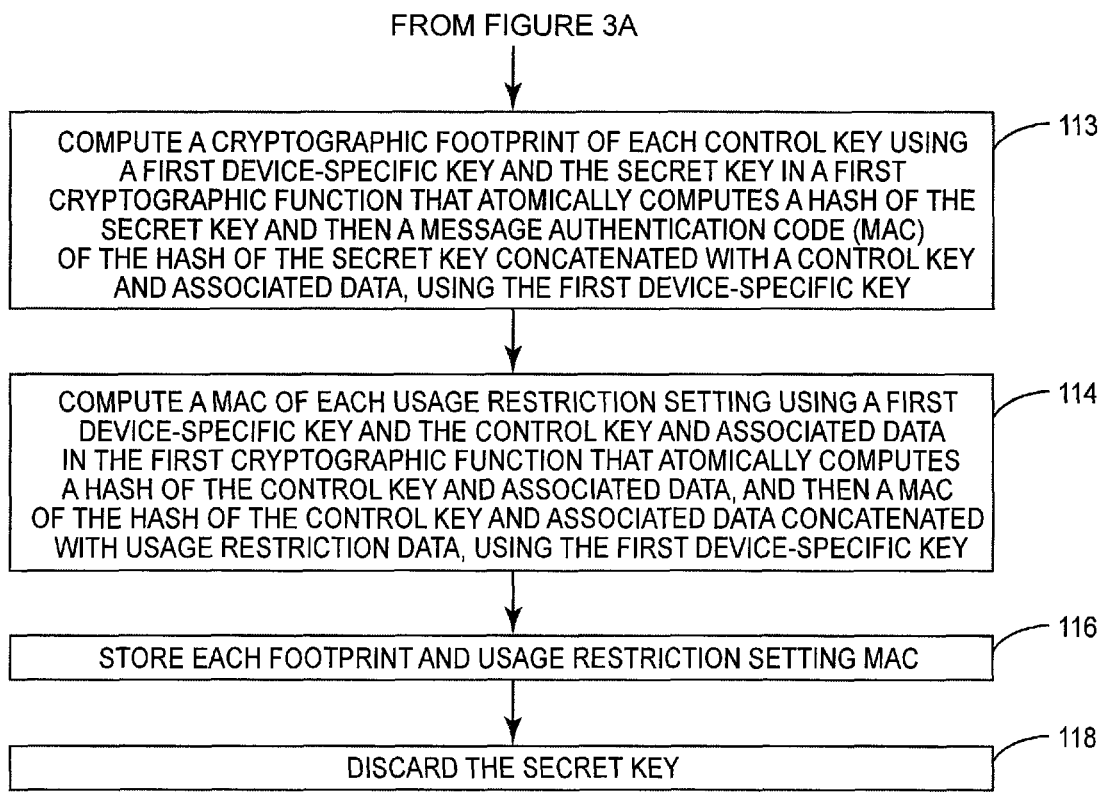

The device 10 is initialized during an initialization or activation procedure 100, as depicted in FIG. 3. The activation procedure 100 typically occurs only once. During activation, the usage restriction settings 50 are transferred to the device 10, typically in a secure (i.e., cryptographically signed) software object 40, along with the control keys and associated data 46 necessary to alter those settings. However, it is possible to re-customize the device with new usage restrictions.

According to embodiments of the present invention, the usage restriction settings 50 common to a batch of devices 10 are contained in a pre-computed, digitally signed software object 40. Each device 10 in the batch receives the software object 40, control keys and data 46, and a secret key X. In an activation mode, each device 10 generates footprints of the control keys and data 46, and MACs of the usage restriction settings 50, using a secret key X and device-specific key K1 (binding the control keys 46 and settings 50 to the device 10), and stores them in non-volatile memory 14. Because the software object 40 is not tied to a specific device 10, it can be generated in a more secure environment than the factory, such as an R&D environment, that does not require device-specific identifiers. The usage restrictions may then be enabled in the factory, or later, with the same level of security. In fact, the usage restrictions may be communicated to the device 10 remotely, such as via Short Messaging Service (SMS) in the case the device 10 is a mobile phone. This approach also enables autolocking, wherein usage restrictions are obtained automatically from the first non-test SIM/USIM card inserted into the device 10.

The activation procedure 100 is implemented by a dedicated program loaded into memory 14 and executed by the processor 12, or alternatively may be performed by customization software included in the device 10 basic platform software. In either case, a device 10 receives, from a computer or network connection, a batch identifier (BID) (step 102). The BID is programmed into OTP elements 30 in the secure circuit 18. In the case of re-customization, it is not necessary to provide the BID since it is already programmed into OTP elements 30. The device 10 also receives a secret key (step 104), which may have been generated in a secure facility, and a software object 40 (step 106). The software object 40 includes the BID, a cryptographic hash of the secret key, and one or more usage restriction settings 50. The device 10 additionally receives one or more control keys and associated data 46, each operative to enable or disable a corresponding usage restriction (step 108). The control keys may be randomly generated at the factory.

The software object 40 is signed with a private key; the device 10 has a corresponding public key 41. This public key is directly bound to the device, for example by storing the hash of the public key in the OTP elements of the secure device, or in another embodiment, indirectly bound to the device via a certificate chain that chains back to another public key bound to the device. The device 10 first verifies the integrity of the software object 40 using the public key (step 110). The BID of the OTP element is checked against the BID in the software object 40, further verifying the software object 40 (step 111). The device 10 computes a hash h(X) of the secret key X, and compares it to the hash h(X) in the software object 40 (step 112), further verifying the software object 40. If the device 10 verifies the software object 40 against the public key (step 110), BID (step 111), and secret key (step 112), the BID is burned into the OTP elements 30, if this has not already been done.

The device 10 uses the received control keys and associated data 46 and generates a cryptographic "footprint" 44 of each control key and associated data 46, using a device-specific key K1 and the secret key X (step 113). The footprints 44 are stored in static data 34 (step 116). Generation of the footprints 44 is discussed in greater detail below.

The device 10 generates a MAC 48 of each usage restriction setting 50, using the device-specific key K1 and the control key corresponding to that usage restriction concatenated with ID and type of control key (i.e., the key and data 46) (step 114), and stores the usage restriction setting MACs 48 in memory (step 116). Generation of the usage restriction setting MACs 48 is discussed in greater detail below.

The secret key X is then discarded (step 118) and its storage wiped (e.g., overwritten with a different data pattern). The hash of the secret key h(X) must be stored integrity protected in the platform. In one embodiment, this is achieved by permanently storing the software object 40 in memory 14, as depicted in FIG. 1. In another embodiment, the hash h(X) is stored in OTP elements 30 of the secure circuit 18.

For usage restrictions in the software object 40 for which autolock is indicated, the device 10 stores the enabling control keys 46 in plaintext until the usage restrictions are enabled. Then these control keys are wiped.

The static data 34—including control key footprints 44—is integrity protected by computing and storing a static data MAC 36.

Control Key Protection

As stated above, the device 10 generates a cryptographic footprint 44 of each control key and associate data 46, using a device-specific key K1 and the secret key X. The data associated with each control key includes an identification of the usage restriction to which it applies, and an indication whether the control key is for enabling or disabling the usage restriction. Requiring a separate control key for each usage restriction and for each state of the restriction ensures that it is not possible to copy one control key to another. For each control key, a hash is computed from the control key and associated data 46 as $$C=h(ID\|s\|CK) \qquad (1)$$

where h( ) denotes a conventional hash function (e.g., SHA-256), ID indicates the associated usage restriction, and s indicates enable or disable. The cryptographic function F1 is then used to compute $$E=MAC(K1,h(X)\|ID\|C). \qquad (2)$$

The footprints are then stored in static data 34 and integrity protected by a static data MAC 36 generated using cryptographic function F3 and device-specific key K2.

To verify a control key, the hash C is computed according to equation (1) above. The static data 34 is then verified using cryptographic function F4 and key K2, and the corresponding control key footprint 44 is extracted. The footprint 44 is verified using cryptographic function F2, key K1, a hash of the secret key h(X), and the extracted footprint 44. The integrity of the hash of the secret key must also be verified. If h(X) is obtained from the software object 40, then the software object 40 must first be cryptographically verified using the device public key. The binding of the software object 40 to the device 10 is then checked by comparing the BID in the software object 40 to the BID stored in OTP elements 30.

Since the device-specific key K1 is available only to cryptographic functions F1 and F2, the cryptographic scheme cannot be spoofed by using K1 in a cryptographic function such as F3 that does not require the secret key X. By using X in the derivation of the footprints 44, the control keys and associated data 46 are bound to X and hence to the software object 40. Knowledge of X is required to change control keys 46.

Usage Restriction Settings Protection

Each usage restriction setting 50 is bound to its corresponding control key and associated data 46 by a usage restriction setting MAC 48 that is generated using the key K1 and the control key and data 46. A usage restriction setting 50 comprises four variables A, B, C, and D:

A is the state of the usage restriction (enabled, disabled, or autolock);

B is the value of the usage restriction if it is enabled (e.g., the number or part of number of a SIM/USIM to which operations are locked);

C is a hash of the associated control key (the control key that was used to bind the data to the usage restriction settings) and its associated data, C=h(ID∥s∥CK); and D is the usage restriction setting MAC 48, computed using cryptographic function F1:

$$D=MAC(K1,h(ID\|s\|CK)\|ID\|A\|h(B)). \qquad (3)$$

Note that the value ID∥s∥CK is input to F1 in lieu of the secret key X. F1 first computes the hash of this value, h(ID∥s∥CK), and then atomically executes the MAC computing function, directly passing it the hash value. This binds the usage restriction setting 50 to its control key 46. The data input to F1 is ID∥A∥h(B). If the usage restriction state is disabled or set to autolock, h(B) is replaced by the empty string.

Additionally, an attempts counter 52 and timer 53 (stored in a non-volatile area of memory 14) are defined for each usage restriction. They define the number of attempts left to disable an enabled usage restriction and the time until the next attempt is allowed. All attempts counters 52 and timers 53 are separately protected using a MAC 54 computed using cryptographic function F3 and a separate device-specific key K3. Note that the lockout mechanism of F3 that blocks the execution of F3 cannot be applied for attempts counters 52 and timers 53 since they are changed whenever an attempt is made to enable or disable a usage restriction 50, and the MAC 54 then must be recomputed.

Usage Restriction Data Verification

During the operational life of the device 10—that is, following activation—the usage restriction data 50 are verified upon reset and prior to altering any usage restriction, to ensure that the data 50 have not been tampered. Note that the device 10 no longer stores the secret key X, but does retain a hash of it, h(X).

The static data 34 is verified against the static data MAC 36 using cryptographic function F4 and key K2. Then, for each usage restriction setting 50, the hash of the control key and associated data (also denoted C) 46 is verified against the corresponding stored footprint 44 (obtained from static data 34) using cryptographic function F2, key K1, and h(X). If the usage restriction state is "enabled," the hash of the usage restriction value h(B) is computed. The usage restriction setting 50 is then verified against part D (the usage restriction setting MAC 48) using cryptographic function F2, key K1, and h(ID∥s∥CK) obtained from part C.

Upon checking the integrity of the usage restriction data 50, the device 10 also verifies the integrity of the attempts counters 52 and timers 53 against their MAC 54 using cryptographic function F4 and device-specific key K3. If any checks fails, at least some key functions of the device 10 are rendered inoperative, and the device 10 must be reset, e.g., at a customer service center.

Disabling a Usage Restriction

To disable a currently enabled usage restriction, the device 10 receives an appropriate usage restriction disable control key. The control key may be obtained over a wired or wireless connection to a computer or network, or may be entered by a user at a user interface such as a keypad. The device 10 first verifies the associated control key footprint 44, read from the static data 34 and verified by the static data MAC 36. The usage restriction setting 50 is also read and verified via the usage restriction setting MAC 48, as described above under "Usage Restriction Data Verification." The device 10 then verifies the usage restriction disable control key against the associated footprint 44, by computing a hash of the control key and associated data 46 and verifying the footprint 44 using cryptographic function F2, using K1 and h(X), as described above under "Control Key Protection."

The device 10 changes the enable/disable indicator to "disable," computes a hash h(ID∥s∥s=disable∥CK) and stores it as the new parameter C of the usage restriction settings 50. The device 10 changes the usage restriction state A to "disabled," and computes a new parameter D, the usage restriction setting MAC 48, as described above under "Usage Restriction Settings Protection."

If the verification of the provided control key 46 fails, an attempts counter 52 is incremented. When the value of the attempts counter 52 reaches a predetermined number, then a timer 53 is started. No new attempt to enable or disable the usage restriction is allowed until the timer 53 expires. If the next attempt fails, the timer 53 is started again. In one embodiment, the duration of the timer 53 increases with each invocation, e.g., exponentially. When the timer 53 has been invoked a predetermined number of times, the device 10 must be reset, e.g., at a customer service center, to allow the state of the corresponding usage restriction to be changed. The attempts counters and timers MAC 54 is recomputed every time an attempts counter 52 or timer 53 is altered.

Enabling a Usage Restriction

A usage restriction must be disabled to enable it. If it is currently enabled, the usage restriction must be disabled prior to enabling it, e.g., to a new value. The device 10 obtains a usage restriction enable control key and the usage restriction value. The value may be taken from a non-test SIM/USIM card 26, or, if no non-test SIM/USIM card 26 is inserted, from a wired or wireless connection to a computer or network.

The device 10 verifies the associated control key footprint 44 read from the static data 34 and verified by the static data MAC 36. The usage restriction setting 50 is also read and verified via the usage restriction setting MAC 48, as described above under "Usage Restriction Data Verification." The device 10 then verifies the usage restriction enable control key against the associated footprint 44, by computing a hash of the control key and associated data 46 and verifying the footprint 44 using cryptographic function F2, using K1 and h(X), as described above under "Control Key Protection."

The device 10 sets the enable/disable indicator to "enable," computes a hash h(ID∥s∥=enable∥CK) and stores it as the new parameter C of the usage restriction settings. The new usage restriction value is stored as parameter B, and a hash h(B) is computed. The device 10 changes the usage restriction state A to "enabled," and computes a new parameter D, the usage restriction setting MAC 48, as described above under "Usage Restriction Settings Protection." The attempts counter 52 and timer 53 for the usage restriction are reset, and the MAC 54 protecting this data is recomputed and stored to memory 14. As described above, if the verification of the provided control key fails, the attempts counter 52 is incremented and the timer 53 started, which prevents access for the duration of the timer 53. If the timer 53 is restarted a predetermined number of times, the device 10 requires resetting at a customer service center to allow the state of the corresponding usage restriction to be changed.

AutoLock

Embodiments of the present invention allow the device 10 to "autolock" one or more usage restrictions to the first non-test SIM/USIM card 26 inserted into the device 10. To utilize autolock, the usage restriction state, parameter A of the usage restriction settings, must be set to "autolock," and a usage restriction enabling control key must be stored in plaintext on the device 10. The autolock feature may be invoked automatically upon the insertion of a non-test SIM/USIM card 26. The device 10 verifies the associated control key footprint 44 read from the static data 34 and verified by the static data MAC 36. The usage restriction setting 50 is also read and verified via the usage restriction setting MAC 48, as described above under "Usage Restriction Data Verification." The device 10 then verifies the usage restriction enable control key against the associated footprint 44, by computing a hash of the control key and associated data 46 and verifying the footprint 44 using cryptographic function F2, using K1 and h(X), as described above under "Control Key Protection."

The device 10 computes a hash h(ID∥s=enable∥CK) and stores it as the new parameter C of the usage restriction settings. The new usage restriction value, read from the SIM/USIM card 26, is stored as parameter B, and a hash h(B) is computed. The device 10 changes the usage restriction state A to "enabled," and computes a new parameter D, the usage restriction setting MAC 48, as described above under "Usage Restriction Settings Protection." The enable control key is then discarded, and its storage location wiped. The attempts counter 52 and timer 53 for the usage restriction are reset, and the MAC 54 protecting this data is recomputed. If the verification of the enable control key fails, the device 10 requires resetting at a customer service center.

Those of skill in the art will readily recognize that, to avoid having the enabling control key in plaintext when using autolock until the usage restrictions are enabled and the key is wiped, it is possible to first perform an extra hash of the control key and use this hash instead of the control key in all places in the solution. That is, where the control key is used as described above, the hash of the control key is used instead. Also, where the hash of the control key is used as described above, the hash of the hash of the control key is used instead. Thus, instead of storing the enabling control key in plaintext, the hash of the enabling control key is stored instead.

Binding Usage Restrictions to Other Keys

In customer service centers, it is sometimes necessary to alter the usage restrictions. For example, a device 10 that is broken may be sent to be repaired. The user that hands in the broken device 10 is issued a new one. When the broken device 10 is repaired, it is given to another user that hands in a different broken device 10. The device 10 of the second user may be locked, via usage restriction settings 50, to a different service provider than the repaired device 10, and the usage restriction settings 50 must be changed. In the case the customer service organization is not allowed to change control keys or do not have the control keys available, one embodiment of the present invention allows binding of one or more usage restrictions to another secret, instead of the enabling/disabling control keys. Typically, successful cryptographic authentication is required to change usage restrictions, and the authentication procedure usually involves a secret to which the usage restrictions can be bound; each usage restriction is bound to the same secret.

One example of such an authentication is the use of an RSA challenge-response scheme. The device 10 first generates a random number, and computes the SHA-256 hash of this random number. Then the hash, concatenated with a device-unique identifier or the BID, is sent to the host as a challenge. The host has access to a private key and signs the challenge using RSA with SHA-256. The signed challenge is sent back to the device 10, which verifies the signature using a corresponding public key stored securely in the device 10. If the signature was successfully verified, the usage restrictions are allowed to be changed. The random number is used as the secret value instead of a control key and associated data 46 when binding the usage restrictions, and is then discarded and its storage location wiped. The hash of the random value is stored as value C and is used when verifying the usage restriction MACs 48. In order to guarantee the integrity of the value C, the signed challenge is also stored. To verify the integrity of C, the signed challenge is verified against the public key securely stored on the device 10.

As used herein, the term control key "footprint" 44 refers to cryptographic data generated over a control key and associated data 46 using cryptographic function F1. Mathematically, the footprint is calculated with a message authentication code (MAC) function, using a hash of a secret key X.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of cryptographically protecting usage restrictions in an electronic device, comprising:
   cryptographically binding a software object to the device via digital signatures and a batch identification associating the device with one or more devices;
   cryptographically binding the software object to a secret cryptographic key via a hash of the secret key;
   cryptographically binding the secret key to a unique control key for each usage restriction by generating and storing a cryptographic footprint of the control key;
   cryptographically binding each control key to usage restriction settings defining the state and values of the usage restrictions by generating and storing a cryptographic message authentication code (MAC) of the usage restriction settings;
   and cryptographically verifying each of the bindings prior to changing any usage restriction setting;
   wherein cryptographically binding the secret key to a unique control key for each usage restriction by generating and storing a cryptographic footprint of the control key comprises generating the cryptographic footprints using a first device-specific key and the secret key in a first cryptographic function that atomically computes a hash of the secret key and then a message authentication code (MAC) of the hash of the secret key concatenated with a control key and associated data, using the first device-specific key, and storing the footprint.

2. The method of claim 1 further comprising, upon changing any usage restriction setting, cryptographically binding the new usage restriction to the associated control key by generating and storing a MAC of the new usage restriction settings.

3. The method of claim 1 wherein verifying the binding between the secret key and the cryptographic footprint comprises using a second cryptographic function that computes a MAC of the hash of the secret key concatenated with a control key and associated data, using the first device-specific key, and comparing the computed MAC to the stored footprint.

4. The method of claim 3 wherein the first device-specific key is unavailable to any operation other than the first and second cryptographic functions.

5. The method of claim 1 wherein the software object is signed using a private key, and wherein the binding to the device is cryptographically verified by verifying the signed software object using a public key, associated with the private key, that is bound to the device.

6. The method of claim 5 wherein the software object further contains a batch identifier, and wherein the binding to the device is cryptographically verified by verifying that the batch identifier of the software object matches the batch identifier stored in the device.

7. The method of claim 1 wherein the software object contains the hash of the secret key and wherein the binding of the secret key to the software object is cryptographically verified by computing the hash of the secret key and comparing it to the hash value stored in the software object.

8. The method of claim 1 further comprising cryptographically integrity protecting the stored footprints by storing the footprints in static data, and computing a MAC over the static data in a third cryptographic function that does not include hash computation, using a second device-specific key, and storing the static data MAC.

9. The method of claim 8 further comprising, upon reading the stored footprints, cryptographically verifying the static data MAC in a fourth cryptographic function that computes a MAC of the static data, using the second device-specific key, and comparing the MAC to that read from static data.

10. The method of claim 8 further comprising a setting a static data MAC calculation inhibition flag operative to block the calculation of the MAC of static data, but allows the verification of static data against the stored static data MAC.

11. A method of cryptographically protecting usage restriction data in an electronic device having a plurality of restricted, device-specific cryptographic keys, comprising, in an activation mode:
    if a batch identifier is not already programmed into the device, receiving a batch identifier associating the device with one or more other devices and programming the batch identifier into the device;
    receiving a secret key;
    receiving one or more control keys and associated data, each control key operative to enable or disable one or more usage restrictions;
    receiving a software object including the batch identifier and a cryptographic hash of the secret key;
    verifying that the batch identifier in the software object matches the device programmed batch identifier;
    verifying the secret key by calculating a hash of the secret key and comparing it to the cryptographic hash of the secret key in the software object;
    computing a cryptographic footprint of each control key using a first device-specific key and the secret key in a first cryptographic function that atomically computes a hash of the secret key and then a message authentication code (MAC) of the hash of the secret key concatenated with a control key and associated data, using the first device-specific key;
    computing a MAC of each usage restriction setting using a first device-specific key and the control key and associated data in the first cryptographic function that atomically computes a hash of the control key and associated data, and then a MAC of the hash of the control key and associated data concatenated with usage restriction data, using the first device-specific key;
    storing the batch identifier, software object, and each footprint, each usage restriction setting MAC, and the hash of each active enabling/disabling control key and associated data; and
    discarding the secret key.

12. The method of claim 11 wherein the software object is signed using a private key, and further comprising:
    receiving a public key associated with the private key; and
    cryptographically verifying the software object using the public key.

13. The method of claim 12 wherein the public key is cryptographically bound to the device.

14. The method of claim 11 wherein the data associated with each control key comprises an identification of the usage restriction on which the control key operates, and whether the control key enables or disables the usage restriction.

15. The method of claim 11 wherein the usage restriction data comprises an identification of the usage restriction, the state of the usage restriction, and, if the state of the usage restriction is "enabled," a hash of a value of the usage restriction.

16. The method of claim 11 further comprising:
    maintaining an attempts counter and timer for each usage restriction;
    storing the attempts counters and timers in memory; and computing a MAC over the attempts counters and timers in the third cryptographic function that does not include hash computation, using a third device-specific key.

17. The method of claim 11 further comprising storing the footprints in static data, and computing a MAC over the static data in a third cryptographic function that does not include hash computation, using a second device-specific key, and storing the static data MAC.

18. The method of claim 1 further comprising, in an operational mode following completion of the activation mode:
  verifying a control key by:
    calculating a hash of the control key and associated data;
    reading the footprint from static data; and
    verifying the control key using the first device-specific key and a hash of the secret key in a second cryptographic function that computes a MAC of the hash of the secret key concatenated with the control key and associated data, using the first device-specific key, and comparing the computed MAC to that read from static data; and
  verifying the MAC of the associated usage restriction setting by:
    reading the usage restriction setting MAC from memory; and
    verifying the usage restriction settings using the first device-specific key and the hash of the control key and associated data in the second cryptographic function that computes a MAC of the hash of the control key and associated data concatenated with the usage restriction data, using the first device-specific key, and comparing the computed MAC to that read from memory.

19. The method of claim 18 wherein the first device-specific key is unavailable to any operation other than the first and second cryptographic functions.

20. The method of claim 18 wherein the integrity, authenticity, and device binding of the secret key is verified before being used in control key verification.

21. The method of claim 18 wherein, when verifying the MAC of the associated usage restriction setting, the stored hash of the control key is verified using the first device-specific key and a hash of the secret key in a second cryptographic function that computes a MAC of the hash of the secret key concatenated with the control key and associated data, using the first device-specific key, and comparing the computed MAC to that read from static data.

22. The method of claim 18 wherein reading the footprint from static data comprises first cryptographically verifying a static data MAC in a fourth cryptographic function that computes a MAC of the static data, using the second device-specific key, and comparing the MAC to that read from static data.

23. The method of claim 18 wherein verifying a control key and verifying the MAC of the associated usage restriction setting further comprises:
  reading an attempts counter and timer and associated MAC for each usage restriction from memory; and
  cryptographically verifying the attempts counter and timer MAC in a fourth cryptographic function that computes a MAC of all attempts counters and timers, using a third device-specific key, and comparing the computed MAC to that read from memory.

24. The method of claim 23 wherein verifying a control key comprises updating the associated attempts counter and timer if the verification fails and computing a MAC of the attempts counter and timers using a third cryptographic function and a third device-specific key.

25. The method of claim 18 wherein the verification steps are performed at least every time the device is initialized.

26. The method of claim 25 wherein the verification steps are additionally performed prior to changing the state of any usage restriction.

27. The method of claim 18 further comprising disabling a usage restriction by:
  calculating a hash of the disabling control key and associated data;
  changing the usage restriction settings to reflect it being disabled; and
  computing a new MAC of the usage restriction setting using the first device-specific key and the disabling control key and associated data in the first cryptographic function that atomically computes a hash of the disabling control key and associated data, and then a MAC of the hash of the disabling control key and associated data concatenated with the updated usage restriction data, using the first device-specific key.

28. The method of claim 27 wherein the disabling control key and associated data comprise an identification of the usage restriction and an indication that the control key disables the usage restriction.

29. The method of claim 27 further comprising writing the changed usage restriction setting, new MAC, and hash of the disabling control key and associated data to memory.

30. The method of claim 18 further comprising enabling a usage restriction that is currently disabled, by:
  calculating a hash of the enabling control key and associated data;
  receiving a usage restriction enablement value;
  calculating a hash of the usage restriction enablement value;
  changing the usage restriction settings to reflect it being enabled, the settings including the hash of the usage restriction enablement value; and
  computing a new MAC of the usage restriction setting using the first device-specific key and the enabling control key and associated data in the first cryptographic function that atomically computes a hash of the enabling control key and associated data, and then a MAC of the hash of the enabling control key and associated data concatenated with the updated usage restriction data, using the first device-specific key.

31. The method of claim 30 wherein the enabling control key associated data comprise an identification of the usage restriction and an indication that the control key enables the usage restriction.

32. The method of claim 30 wherein receiving a usage restriction enablement value comprises receiving the value from a Subscriber Identification Module (SIM/USIM) card if a usage restriction locks the device to the SIM/USIM card.

33. The method of claim 30 further comprising writing the changed usage restriction setting, new MAC, and hash of the enabling control key and associated data to memory.

34. The method of claim 30 further comprising:
  resetting an attempts counter and timer associated with the usage restriction;
  storing the attempts counter and timer in memory; and
  computing a MAC over the attempts counters and timers in a third cryptographic function that does not include hash computation, using a third device-specific key.

35. The method of claim 18 wherein, during the activation mode, a usage restriction enabling control key was stored in plaintext, and wherein the associated usage restriction setting indicates an autolock state, further comprising:

detecting that a non-test Subscriber Identification Module (SIM) or Universal Subscriber Identification Module (USIM) card has been installed in the device;
calculating a hash of the enabling control key and associated data, the associated data indicating an enablement of the usage restriction;
obtaining a usage restriction enablement value from the SIM/USIM card;
calculating a hash of the usage restriction enablement value;
changing the usage restriction settings to reflect it being enabled, the settings including the hash of the usage restriction enablement value; and
computing a new MAC of the usage restriction setting using the first device-specific key and the enabling control key and associated data in the first cryptographic function that atomically computes a hash of the enabling control key and associated data, and then a MAC of the hash of the enabling control key and associated data concatenated with the updated usage restriction data, using the first device-specific key; and
erasing the plaintext enabling control key.

36. The method of claim 35 wherein the enabling control key associated data comprise an identification of the usage restriction and an indication that the control key enables the usage restriction.

37. The method of claim 35 further comprising writing the changed usage restriction setting, new MAC, and hash of the enabling control key and associated data to memory.

38. The method of claim 35 further comprising:
resetting an attempts counter and timer associated with the usage restriction;
storing the attempts counter and timer in memory; and
computing a MAC over the attempts counter and timer in a third cryptographic function that does not include hash computation, using a third device-specific key.

39. The method of claim 18 wherein, during the activation mode, the hash of a usage restriction enabling control key was calculated and stored, and wherein the associated usage restriction setting indicates an autolock state, further comprising:
detecting that a non-test Subscriber Identification Module (SIM) or Universal Subscriber Identification Module (USIM) card has been installed in the device;
calculating a hash of the hash of the enabling control key and associated data, the associated data indicating an enablement of the usage restriction;
obtaining a usage restriction enablement value from the SIM/USIM card;
calculating a hash of the usage restriction enablement value;
changing the usage restriction settings to reflect it being enabled, the settings including the hash of the usage restriction enablement value; and
computing a new MAC of the usage restriction setting using the first device-specific key and the hash of the enabling control key and associated data in the first cryptographic function that atomically computes a hash of the hash of the enabling control key and associated data, and then a MAC of the hash of the hash of the enabling control key and associated data concatenated with the updated usage restriction data, using the first device-specific key.

40. A method of automatically cryptographically protecting usage restriction data in an electronic device based on a non-test Subscriber Identity Module (SIM) or Universal Subscriber Identification Module (USIM) inserted into the device, without storing a control key in plaintext, the device having a plurality of restricted, device-specific cryptographic keys, comprising, in an activation mode:
receiving a secret key;
receiving a usage restriction enabling control key, operative to enable at least one usage restriction;
receiving a software object including the batch identifier and a cryptographic hash of the secret key;
verifying the secret key by calculating a hash of the secret key and comparing it to the cryptographic hash of the secret key in the software object;
calculating a hash of the control key;
computing a cryptographic footprint of the hash of the control key using a first device-specific key and the secret key in a first cryptographic function that atomically computes a hash of the secret key and then a message authentication code (MAC) of the hash of the secret key concatenated with a hash of the hash of the control key and associated data, using the first device-specific key;
storing the software object, footprint, and the hash of the control key; and
discarding the secret key and control key.

41. The method of claim 40 further comprising, in an operational mode following completion of the activation mode:
verifying the hash of the control key by:
calculating a hash of the hash of the control key and associated data;
reading the footprint from static data; and
verifying the hash of the control key using the first device-specific key and a hash of the secret key in a second cryptographic function that computes a MAC of the hash of the secret key concatenated with the hash of the hash of the control key and associated data, using the first device-specific key, and comparing the computed MAC to that read from static data.

42. The method of claim 41 further comprising enabling the usage restriction, by:
calculating a hash of the hash of the control key and associated data;
reading a usage restriction enablement value from a non-test Subscriber Identity Module (SIM) or Universal Subscriber Identification Module (USIM) inserted into the device;
calculating a hash of the usage restriction enablement value;
creating a usage restriction setting indicating the usage restriction is enabled and including the hash of the usage restriction enablement value; and
computing a MAC of the usage restriction setting using the first device-specific key and the hash of the control key and associated data in the first cryptographic function that atomically computes a hash of the hash of the control key and associated data, and then a MAC of the hash of the hash of the control key and associated data concatenated with the updated usage restriction data, using the first device-specific key.

43. An electronic device, comprising:
a processor;
memory accessed by the processor, at least some of the memory being non-volatile; and
a cryptographic circuit operative to execute a first cryptographic function that atomically computes a hash of a first parameter, and then a message authentication code (MAC) of the hash of the first parameter concatenated with data to be protected, using a first device-specific key;

wherein the processor is operative to store the MAC generated by the first cryptographic function in non-volatile memory.

44. The device of claim 43 further comprising a secure circuit holding the first device-specific key, providing the first device-specific key directly to the cryptographic circuit, and protecting the first device-specific key from access by any other module or function.

45. The device of claim 43 wherein the cryptographic circuit is further operative to execute a second cryptographic function that verifies data to be protected by calculating a new MAC of a hash of the first parameter concatenated with data to be protected, using the first device-specific key, and comparing the new MAC to a MAC read from memory.

46. The device of claim 45 wherein the first device-specific key is available only to the first and second cryptographic functions.

47. The device of claim 43 further comprising an access control circuit operative to limit access to the cryptographic circuit to secure hardware modules and secure software functions.

48. A method of cryptographically protecting usage restrictions in an electronic device, comprising:

generating a random number and calculating a hash of the random number;

sending the hash and a device-unique identifier to a host as a challenge;

receiving from the host, the challenge cryptographically signed using a private key;

verifying the cryptographic signature of the challenge using a corresponding public key; and if the signature is successfully verified, cryptographically binding the random number to one or more usage restriction settings defining the state and values of each usage restrictions by generating and storing a cryptographic message authentication code (MAC) of the usage restriction settings; and cryptographically verifying each of the bindings prior to changing any usage restriction setting.

49. The method of claim 48 wherein cryptographically binding the random number to a usage restriction setting comprises computing a MAC of the usage restriction setting using a first device-specific key and the random number in the first cryptographic function that atomically computes a hash of the random number, and then a MAC of the hash of the random number concatenated with usage restriction data, using the first device-specific key, storing the MAC, the hash of the random number, and the signed challenge, and discarding the random number.

50. The method of claim 48 wherein verifying the binding between the random number and a usage restriction setting comprises using the first device-specific key and the hash of the random number in a second cryptographic function that computes a MAC of the hash of the random number with the usage restriction data, using the first device-specific key, and comparing the computed MAC to that read from memory.

* * * * *

UNITED STATES PATENT AND TRADEMARK OFFICE
CERTIFICATE OF CORRECTION

PATENT NO. : 8,225,110 B2
APPLICATION NO. : 12/351643
DATED : July 17, 2012
INVENTOR(S) : Ståhl et al.

It is certified that error appears in the above-identified patent and that said Letters Patent is hereby corrected as shown below:

On the Title Page, Item (12), under "United States Patent", Line 1, delete "Stáhl" and insert -- Ståhl --, therefor.

On the Title Page, Item (75), under "Inventors", Line 1, delete "Stáhl," and insert -- Ståhl, --, therefor.

On the Title Page, Item (52), under "U.S. Cl.", Lines 1-2, delete "360/247; 360/277" and insert -- 380/247; 380/277 --, therefor.

On the Title Page, Item (58), under "Field of Classification Search", Line 1, delete "713/193," and insert -- 713/193; --, therefor.

On Page 2, Item (56), under "OTHER PUBLICATIONS", Line 2, delete "wwww." and insert -- www. --, therefor.

On Page 2, Item (56), under "OTHER PUBLICATIONS", Line 3, delete "(Phast 2+);" and insert -- (Phase 2+); --, therefor.

On Page 2, Item (56), under "OTHER PUBLICATIONS", Line 4, delete ""hash" and insert -- "Hash --, therefor.

In the Specification:

In Column 2, Line 27, delete "ME" and insert -- ME (Mobile Equipment) --, therefor.

In Column 5, Line 22, delete "Circuit" and insert -- Integrated Circuit --, therefor.

In Column 7, Line 32, after " $Z = \begin{cases} \text{TRUE}, & R' = MAC(K2, P) \\ \text{FALSE}, & R' \neq MAC(K2, P) \end{cases}$ " insert Equation No. -- (F4) --.

Signed and Sealed this
Ninth Day of April, 2013

Teresa Stanek Rea
*Acting Director of the United States Patent and Trademark Office*

CERTIFICATE OF CORRECTION (continued)
U.S. Pat. No. 8,225,110 B2

In Column 10, Line 58, delete "$h(ID\|s\|s=disable\|CK)$," and insert -- $h(ID \| s = disable \| CK)$ --, therefor.

In Column 11, Line 29, delete "$h(ID\|s\|=enable\|CK)$," and insert -- $h(ID \| s = enable \| CK)$ --, therefor.